(12) United States Patent
Terada et al.

(10) Patent No.: US 6,713,175 B1
(45) Date of Patent: Mar. 30, 2004

(54) BIAXIALLY STRETCHED BIODEGRADABLE FILM

(75) Inventors: Shigenori Terada, Shiga (JP); Jun Takagi, Tokyo (JP)

(73) Assignee: Mitsubishi Plastics, Inc., Tokyo (JP)

( * ) Notice: Subject to any disclaimer, the term of this patent is extended or adjusted under 35 U.S.C. 154(b) by 0 days.

(21) Appl. No.: 10/111,594

(22) PCT Filed: Oct. 23, 2000

(86) PCT No.: PCT/JP00/07398

§ 371 (c)(1),
(2), (4) Date: Sep. 3, 2002

(87) PCT Pub. No.: WO01/30889

PCT Pub. Date: May 3, 2001

(30) Foreign Application Priority Data

Oct. 26, 1999 (JP) .......................................... 11-303937

(51) Int. Cl.$^7$ .......................... B32B 7/12; B32B 27/36; C08G 63/08
(52) U.S. Cl. ........................ 428/349; 428/346; 428/347; 428/480; 428/910; 528/271; 528/354; 528/359; 528/361
(58) Field of Search ................................. 428/343, 346, 428/347, 349, 480, 910; 264/288.4, 290.2; 528/271, 354, 359, 361

(56) References Cited

FOREIGN PATENT DOCUMENTS

| JP | 6-171664 | 6/1994 |
|---|---|---|
| JP | 7-205278 | 8/1995 |
| JP | 8-73628 | 3/1996 |
| JP | 08-198955 | 8/1996 |
| JP | 8-252895 | 10/1996 |
| JP | 9-77124 | 3/1997 |
| JP | 10-151715 | 6/1998 |
| JP | 11-106628 A * | 4/1999 |
| JP | 2000-103879 | 4/2000 |
| JP | 2002-127342 A * | 5/2002 |
| JP | 2002-127344 A * | 5/2002 |
| WO | 00/02459 | 1/2000 |

OTHER PUBLICATIONS

Jun Takagi, "Lactic–acid–based Biodegradable Polymer" ("Polylactic Acid Biaxial Drawn Film, Its Characteristics and Expansion of Its Use"), Magazine "PACKPIA", No. 523, pp. 12–19, published Feb. 1, 1996.

* cited by examiner

Primary Examiner—Vivian Chen
(74) Attorney, Agent, or Firm—Wenderoth, Lind & Ponack, L.L.P.

(57) ABSTRACT

An object is to provide a biaxially stretched film which allows tacking, is heat-stickable, is less liable to unevenness in thickness, breakage, whitening, unevenness, etc. i.e. has stretching stability and is decomposable in the natural environment. It comprises a polylactic acid-family polymer as its major component, and has a storage elastic modulus E' at 120° C. of 100–230 MPa as measured using a test method concerning temperature dependency of the dynamic viscous elasticity under JIS K7198.

15 Claims, No Drawings

BIAXIALLY STRETCHED BIODEGRADABLE FILM

TECHNICAL FIELD

This invention relates to a biodegradable biaxially stretched film.

BACKGROUND ART

Most of conventional plastic products, especially plastic packaging materials are discarded soon after use, and their disposal problems are pointed out. Among general purpose packaging plastics, as representative ones, polyethylene, polypropylene, polyethylene terephthalate ("PET"), etc. can be cited. But these materials are high in heat buildup when burned and there is a possibility of damaging the incinerator during burning treatment. Further, polyvinyl chlorides, which are large in the amount of use even now, cannot be burned due to their self-extinguishing properties. Also, in many cases, plastic products including such materials which cannot be burned, are buried. But due to their chemical and biological stability, they scarcely decompose but remain, thus causing a problem that they shorten the life of burial sites. Therefore, plastic products that are low in heat buildup during burning, decompose in soil, and safe are desired, and many researches are being made.

As one example, there are polylactic acids. For polylactic acids, the heat buildup during burning is less than half that of polyethylene, and hydrolysis proceeds naturally in soil or water and then they are decomposed by microorganisms into unharmful materials. Now researches are being made for obtaining molded products, specifically film sheets and containers such as bottles using polylatic acids.

Polylactic acid is a polymer formed by condensation-polymerizing a lactic acid. Lactic acids have two kinds of optical isomers, i.e. L-lactic acid and D-lactic acid. Their crystallizability varies with the ratio between these two. For example, a random copolymer of which the L-lactic acid to D-lactic acid ratio is 80:20 to 20:80 has no crystallizability. In other words, it is a transparent, completely amorphous polymer which softens near its glass transition point of 60° C. On the other hand, for a homopolymer made up of only L-lactic acid or D-lactic acid, although its glass transition point is likewise 60° C., it becomes a semicrystalline polymer having a melting point of 180° C. or over. The semicrystalline polylactic acid turns into an amorphous material that excels in transparency, by rapidly cooling after melt extrusion.

It is known that it is possible to improve its strength and shock resistance of a polylactic acid by biaxially stretching it during forming into film. Further, it is known to manufacture a film which will not substantially shrink by suppressing the heat shrinkage of the film by heat-treating it after biaxial stretching. The heat shrinkage rate is determined by the heat treatment temperature and time of the film and the properties of the raw materials used. So the heat treatment temperature and time are suitably adjusted according to the properties of the film material.

After packaging an article in a film, clear fold lines are sometimes formed by slightly fusing the film by applying a hot plate so as not to easily rise. Specifically, this is done for packaging folded neatly in end faces of a cubic article such as video tapes and cassette tapes, packaging of cubic gums, and packaging of boxed tobacco. For them, stretched polypropylene film, cellophane, etc. are used. For them, K-coat film and K-coat cellophane having its surface coated with vinylidene chloride are used. Tacking is usually done by melting the vinylidene chloride layer by pressing a hot plate.

But such vinylidene chlorides are said to be one of today's environmental pollution sources, and they cause various problems. For example, they promote production of dioxin if burned at low temperature. Thus, for a polylatic acid biaxially stretched film too, it is not preferable to perform K-coating.

To polylactic acid biaxially stretched film, by adjusting the manufacturing method, it is possible to impart heat setting properties while suppressing heat shrinkage. This is because a polylatic acid is low in crystallizability compared with polypropylene or polyethylene terephthalate. Further, by setting it to a film having a suitable crystallizability, it is possible to solve the above problems.

An object of the present invention is to provide a biaxially stretched film which is decomposable in the natural environment, and by solving the above problems, allows tacking, has heat stickability, suppresses thickness unevenness, break, whitening and unevenness, and which has stretching stability.

DISCLOSURE OF THE INVENTION

In order to solve the above problems, the present invention provides a biodegradable biaxially stretched film comprising a polylatic acid-family polymer as the major component, and having a storage elastic modulus at 120° C. of 100–230 MPa as measured using test method concerning temperature dependency of the dynamic viscous elasticity under JIS K7198.

Preferable embodiments of this invention include a biodegradable biaxially stretched film having an area stretching ratio of 6.8 times or over, biaxially stretched at a longitudinal stretching temperature of 70–90° C. and a lateral stretching temperature of 70–80° C., and after biaxial stretching, heat-set at a temperature of 100° C. to melting point (Tm) in a gripped state, a biodegradable biaxially stretched film having an area stretching ratio of 6.8 times or over, simultaneously biaxially stretched at a stretching temperature of 70–80 ° C., and after biaxial stretching, heat-set at a temperature of 100° C. to melting point (Tm) in a gripped state, a biodegradable biaxially stretched film having a tensile strength of 1000–2000 kgf/cm$^2$ and a tensile elongation of 5–150% as measured at a tensile speed of 200 mm/min using a No. 2 test piece under JIS K 7129, and a biodegradable biaxially stretched film having the weight-average molecular weight of the polylactic acid-family polymer of 60000–700000.

BEST MODE FOR EMBODYING THE INVENTION

Hereinbelow, embodiments of this invention will be described.

The biodegradable biaxially stretched film according to this invention is a film comprising a polylactic acid-family polymer as its major component and having a storage elastic modulus E' at 120° C. of 100–230 MPa.

The polylactic acid-family polymer is a homopolymer of D-lactic acid or L-lactic acid, or a copolymer of D-lactic acid or L-lactic acid. It may contain other hydroxy-carboxylic acid units as a small amount of copolymeric components and may also contain a small amount of chain extender residual groups.

As the polymerizing method, a known method such as condensation polymerization or ring opening polymerization may be used. For example, in the condensation polymerization, it is possible to obtain a polylactic acid having any desired composition by directly subjecting L-lactic acid, D-lactic acid or mixture thereof to dehydration condensation polymerization.

Also, in the ring-open polymerization method (lactide method), by polymerizing a lactide, which is a cyclic dimer of a lactic acid, it is possible to obtain a polylactic acid using a selected catalyst and a polymerization adjusting agent or the like as necessary.

The weight-average molecular weight of the polylactic acid-family polymer is preferably 60000–700000, more preferably 80000–400000, and most preferably 100000–300000. If the molecular weight is less than 60000, practical physical properties such as mechanical properties and heat resistance will scarcely reveal. If higher than 700000, the melt viscosity will be too high, so that molding workability is poor.

As other hydroxy-carboxylic acids as the small-amount copolymer components, it is possible to cite optical isomers of lactic acids (D-lactic acid for L-lactic acid and L-lactic acid for D-lactic acid), 2-functional aliphatic hydroxy carboxylic acids such as glycolic acid, 3-hydroxy butyric acid, 4-hydroxy butyric acid, 2-hydroxy-n-butyric acid, 2-hydroxy-3,3-dimethyl butyric acid, 2-hydroxy-3-methyl butyric acid, 2-methyl lactic acid, and 2-hydroxy caproic acid: lactones such as caprolactone, butyrolactone and valerolactone.

Further, if necessary, as a small amount of copolymerizing component, nonaliphatic dicarboxylic acids such as terephtahlic acid and/or nonaliphatic diols such as ethylene oxide adducts of bisphenol A may be used.

For the purpose of adjusting various physical properties, heat stabilizers, light stabilizers, light absorbers, lubricants, plasticizers, inorganic fillers, colorants, pigments, etc. may be added.

As a method of manufacturing a biaxially stretched film of which the major component is a polylactic acid-family polymer, a method may be used in which after a web-like product or a cylindrical product extruded from a T-die, I-die or round die has been solidified in a state close to amorphous by quenching it by use of cooling cast rolls, water or pressurized air, it is biaxially stretched by the roll method, tenter method, tubular method, etc.

For the manufacture of a biaxially stretched film, successive biaxial stretching method in which longitudinal stretching is carried out by the roll method and followed by lateral stretching by the tenter method, or simultaneous biaxial stretching method in which longitudinal and lateral stretching are simultaneously carried out by use of a tenter is normally used.

Stretching conditions may be selected within the range of 1.5–6 times in the longitudinal direction and 1.5–6 times in the lateral direction. Further, in view of the film strength and evenness of thickness, stretching is preferably two times or over both in longitudinal and lateral directions. In particular, the area stretching ratio obtained by multiplying the longitudinal and lateral stretching ratio is preferably 6.8–36 times.

In the successive biaxially stretching method, the longitudinal stretching temperature is preferably 70–90° C. and the lateral stretching temperature is preferably 70–80° C. In the simultaneous biaxially stretching method, because it is included in the successive biaxially stretching method, stretching is preferably carried out at the stretching temperature of 70–80° C. If the area stretching magnification and the stretching temperature are not within the abovesaid ranges, the evenness of thickness of the film obtained tends to be extremely low. This tendency is especially remarkable with a film that is heat-set after stretching. Such an unevenness in thickness is a factor that can severely cause wrinkles or corrugation in the secondary working such as printing on films, lamination on other films or on metallic foil or paper, or bag making.

In order to suppress heat shrinkage of film, after biaxial stretching, it is important to carry out heat setting with the film gripped. Normally in the tenter method, since film is stretched while being gripped by a clip, it is possible to carry out heat setting immediately after stretching.

The heat setting temperature is, though depending upon the melting point of the polylatic acid-family polymer used, preferably in the range of 100° C. to melting point (Tm). The heat setting time is preferably at least 3 seconds. If it is below such a range, the heat shrinkage rate of the film obtained is too high, so that problems such as shrinkage of film tend to occur in the secondary working of the film. In order not to cause such problems, it is important that the heat shrinkage is 5% or less in warm water 80° C./10 seconds, preferably 3% or less. If the heat setting temperature is over the melting point, the film will melt during heat setting, which will break the film.

The biodegradable biaxially stretched film obtained by such stretching and heat setting should have a storage elastic modulus E' at 120° C. of preferably 100–230 MPa, more preferably 120–200 MPa as measured using the test method concerning temperature dependency of dynamic viscous elasticity under JIS K 7198. If the E' value is larger than 230 MPa, the crystallinity of the film would be too high, which will lower the content of the amorphous portion. This lowers heat-stickability of the film, making it difficult to finish with the film to a beautiful package. But since the shrinkage of the film is low, when a hot plate is applied against it, the film will not shrink. If the E' value is smaller than 100 MPa, the shrinkage of the film is too high, so that even though it has heat-stickability, when a hot plate is pressed against it, finish will be poor in appearance. Further, the secondary workability will be inferior too.

Specifically, in bag making using a heat setting machine in which film is heated by burning and cutting it with heat ray, uneven shrinkage occurs at heat-set portions due to heat transfer, thus worsening the finish.

The biodegradable biaxially stretched film obtained by such stretching and heat setting has preferably a tensile strength of 1000–2000 $kgf/cm^2$ and a tensile elongation of 50–150%, more preferably a tensile strength of 1100–1500 $kgf/cm^2$ and a tensile elongation of 60–120%, as measured at a tensile speed of 200 mm/min using No. 2 test pieces under JIS K 7127. If the tensile strength is less than 1000 $kgf/cm^2$, in the second working such as printing or bag making, when the film is unrolled while longitudinally applying tension, if it is thin, the film may not withstand the tension and break. Also, if it is over 2000 $kgf/cm^2$, in laminating the film with another film, metallic foil or paper, due to tension applied during working, stress may remain in the finished laminate and it curls. If the tensile elongation is less than 50%, as with the tensile strength, it tends to break during secondary working. If it is over 150%, the film will be insufficient in elastic deformation. If tension is applied during secondary working, the film may be plastically deformed, so that sagging tends to occur in the film, which can cause wrinkles in the film.

The biodegradable biaxially stretched film according to this invention can be used for folded packaging for video tapes, cassette tapes, compact discs, floppy discs, etc. and for folded packaging for tobacco, caramel and granular gum.

EXAMPLES

Hereinbelow, examples are shown. But they are not of a nature limiting the present invention whatsoever. Hereinbelow, methods of measurements carried out in Examples and Comparative Examples will be shown.

(1) Stretching Magnification

Longitudinal stretching ratio: It is expressed by the following formula from the flow speed of a raw material film before stretching and that of the film immediately after stretching.

Longitudinal stretching ratio=(flow speed of the raw material film after longitudinal stretching)/(flow speed of the film before longitudinal stretching)

Lateral stretching ratio: It is a value obtained by dividing a value obtained by subtracting the width of the portion gripped by a clip of a tenter from the width of the raw material film after lateral stretching, by a value obtained by subtracting the width of the portion gripped by the clip from the width of the film obtained before longitudinal elongation. It is expressed by the following formula:

Lateral stretching ratio=[(film width after stretching)−(width of the portion gripped by clip)]/[(raw material film width before stretching)−(width of the portion gripped by the clip)]

(2) Storage Elastic Modulus E'

The measurement was carried out under JIS K 7198.

(3) Tensile Strength and Elongation

Using a TENSILON type II tensile tester made by Toyo Seiki Co., Ltd. under JIS K 7127 using No. 2 test specimens, at a temperature of 23° C., chuck intervals of 80 mm, gage mark intervals of 25 mm, and a tensile speed of 200 mm/min, the maximum strength and elongation when the film breaks were determined. For specimens, length and width of the films were tested at five points and their average values were determined. The first digit of the numerical values obtained was rounded off.

(4) Heat Shrinkage

Each film sample was cut out by 140 mm (width 10 mm) in the longitudinal and lateral directions, gage marks were put at intervals of 100 mm, and immersed in warm water bath at 80° C. for 5 minutes. The dimensions between the gage marks were measured to calculate the heat shrinkage rate by use of the following formula:

Heat shrinkage rate (%)=[(dimension before shrinking)−(dimension after shrinking)]/(dimension before shrinking)×100

(5) Thickness Evenness

The thickness of the films obtained was measured at 10 points in the width direction at equal intervals and at 20 points in the longitudinal direction at intervals of 500 mm, at a total of 200 points, and the average value (X) and standard deviation (σ) of the thicknesses were determined to obtain (3σ/X)×100 (%).

For ones in which this value was below 15%, (○) was indicated as having a good thickness. For ones with 15% or over, (X) was indicated.

(6) Bag Formability

Film having a width of 480 mm was unrolled and folded in half along a triangular plate (triangular cone) with an overlap of 30 mm to make two-sides sealed type envelopes (bags) having a width of 118 mm. The folded films were fed intermittently and heat-set one after another.

For ones in which the film was properly folded with no wrinkles and in which the heat-set portions was low in shrinkage and finish was good, (○) was indicated. For ones that caused the abovesaid problems, (X) was indicated.

(7) Heat Stickability

Three video tapes each in a commercially available 190 mm×102 mm×25 mm polypropylene case was superposed, and a film cut out to 370 mm in length×290 mm in width was wound around the superposed video tape cases to package them. Of the 370 mm film, the 15 mm portion was the portion where the film was overlapped. Both end faces were folded into a triangular shape so that the film would be brought into close contact with the video tape cases. The overlapped portion and the folded surfaces at both ends of the film were brought into contact with a hot stage set to 90–100° C. for about 3 seconds to fuse films together.

For the heat-set portions in which they were easily peeled off but close contact sensation of films was felt and while portions which yielded to stiffness of the film did not rise, and those in which deformation was not felt, though slight shrinking was observed, (○) was indicated. On the other hand, for ones in which no fusing were observed, ones in which bent portions peeled off the video tapes, and ones that have severely shrunk and were ugly in appearance, (X) was indicated.

Example 1

A polylactic acid having a weight-average molecular weight of 200 thousand (made by Cargill-Dow Polymers LLC, trade name: EcoPLA4040D (lot No. MJ0328P103)) and 1 part by weight of particulate silicon dioxide (silica) (trade name: Sylysia 430) having an average particle diameter of about 2.5 μm (made by Fuji Silysia Chemical Ltd.) were dried to sufficiently remove moisture, put in a co-rotating twin-screw extruder having a 40 mm diameter, melt-mixed at about 200° C., extruded in strands, and cut to pellets while cooling. The pellets as a master batch were dried again, mixed by 10% into the abovementioned polylactic acid which was also dried. The mixture was put in a co-rotating twin-screw extruder having a 40 mm diameter, extruded into a sheet at the temperature of 210° C., and quenched and solidified in a rotary cooling drum to obtain a practically amorphous sheet.

The obtained sheet was heated by use of an infrared heater while bringing it into contact with a warm water circulating type roll, stretched between rolls having different peripheral speeds by 3.0 times in the longitudinal direction at 77° C. and then by 3.0 times in the lateral direction relative to the film flow at 75° C. by guiding the longitudinally stretched sheet into a tenter while gripping it with a clip, and heated for about 20 seconds at 135° C. As a result, a film having a thickness of 40 μm was prepared. Evaluation results of the films obtained are shown in Table 1.

Example 2

Except that the sheet was stretched in a longitudinal direction by 2.7 times at 77° C. and stretched in a lateral direction by 3.5 times at 76° C., and heat setting was carried out at a temperature of 125° C. for 15 seconds, a film having a thickness of 40 μm was formed in the same manner as in Example 1. Evaluation results of the film obtained are shown in Table 1.

Example 3

Using a polylactic acid having a weight-average molecular weight of 200 thousand (made by Cargill-Dow Polymers LLC, trade name: EcoPLA4040D (lot No. Mj0528P103)), except that the sheet was stretched in a longitudinal direction by 3.0 times at 78° C. and stretched in a lateral direction by 3.5 times at 77° C., and heat setting was carried out at a temperature of 120° C. for 15 seconds, a film having a thickness of 40 μm was formed in the same manner as in Example 1. Evaluation results of the film obtained are shown in Table 1.

Example 4

Except that the sheet was stretched in a longitudinal direction by 3.0 times at 78° C. and was stretched in a lateral direction by 3.5 times at 77° C., and heat setting was carried out at a temperature of 120° C. for 20 seconds, a film having a thickness of 40 μm was formed in the same manner as in Example 3. Evaluation results of the film obtained are shown in Table 1.

Example 5

Using a polylactic acid having a weight-average molecular weight of 200 thousand (made by Cargill-Dow Polymers LLC, trade name: EcoPLA4030D (lot No. MF0428P103)), except that the sheet was stretched in a longitudinal direction by 2.7 times at 77° C. and stretched in a lateral direction by 3.3 times at 75° C., and heat setting was carried out at a temperature of 130° C. for 15 seconds, a film having a thickness of 40 μm was formed in the same manner as in Example 1. Evaluation results of the film obtained are shown in Table 1.

Comparative Example 1

Using a polylactic acid having a weight-average molecular weight of 220 thousand (made by SHIMADZU corporation, LACTY 5001, lot No. DSPM80318), except that the sheet was stretched in a longitudinal direction by 2.4 times at 77° C. and stretched in a lateral direction by 2.5 times at 75° C., and heat setting was carried out at a temperature of 130° C. for 25 seconds, a film having a thickness of 40 μm was formed in the same manner as in Example 1. Evaluation results of the film obtained are shown in Table 1.

Comparative Example 2

Except that the sheet was stretched in a longitudinal direction by 1.8 times at 70° C. and stretched in a lateral direction by 2.2 times at 68° C., and heat setting was carried out at a temperature of 130° C. for 30 seconds, a film having a thickness of 40 μm was formed in the same manner as in Comparative Example 1. Evaluation results of the film obtained are shown in Table 1.

Comparative Example 3

Using a polylactic acid having a weight-average molecular weight of 170 thousand (made by Cargill-Dow Polymers LLC, trade name: EcoPLA (lot No. MB2728P101)), except that the sheet was stretched in a longitudinal direction by 3.0 times at 78° C. and stretched in a lateral direction by 3.5 times at 77° C., and heat setting was carried out at a temperature of 110° C. for 15 seconds, a film having a thickness of 40 μm was formed in the same manner as in Example 1. Evaluation results of the film obtained are shown in Table 1.

Industrial Feasibility

According to this invention, the biodegradable biaxially stretched film obtained allows tacking and has heat stickability at low temperature. Thus, when used to packaging rectangular articles, it is possible to fold it precisely along fold lines and to easily fuse it by applying heat to joint portions.

Also, the biodegradable biaxially stretched film obtained is free from unevenness in thickness, breakage, whitening, unevenness, etc. That is, it has stretching stability.

Further, since its major component is a polylactic acid polymer, it provides a biaxially stretched film that is degradable in natural environment.

TABLE 1

| | | Example | | | | | Comparative Example | | |
|---|---|---|---|---|---|---|---|---|---|
| | | 1 | 2 | 3 | 4 | 5 | 1 | 2 | 3 |
| stretching | | | | | | | | | |
| ratio (times) | MD | 3.0 | 2.7 | 3.0 | 2.5 | 2.7 | 2.4 | 1.8 | 3.0 |
| | TD | 3.0 | 3.5 | 3.5 | 3.0 | 3.3 | 2.5 | 2.2 | 3.5 |
| temperature (° C.) | MD | 77 | 77 | 78 | 75 | 77 | 72 | 70 | 78 |
| | TD | 75 | 76 | 77 | 73 | 75 | 70 | 68 | 77 |
| heat setting | | | | | | | | | |
| temperature (° C.) | | 135 | 125 | 120 | 120 | 130 | 130 | 130 | 90 |
| time (sec) | | 20 | 15 | 15 | 20 | 15 | 25 | 30 | 15 |
| storage modulus E' (Mpa) | | | | | | | | | |
| | MD | 190 | 180 | 150 | 140 | 220 | 270 | 250 | 90 |
| | TD | 180 | 190 | 160 | 150 | 220 | 250 | 240 | 90 |
| tensile strength (kgf/mm$^2$) | | | | | | | | | |
| | MD | 1250 | 1190 | 1220 | 1150 | 1290 | 1250 | 950 | 1180 |
| | TD | 1210 | 1310 | 1300 | 1070 | 1350 | 1150 | 920 | 1240 |
| elongation at break (%) | | | | | | | | | |
| | MD | 100 | 110 | 90 | 120 | 90 | 100 | 180 | 130 |
| | TD | 90 | 70 | 70 | 110 | 60 | 80 | 150 | 120 |
| heat shrinkage (%) | | | | | | | | | |
| | MD | 2 | 1 | 2 | 1 | 1 | 1 | 2 | 8 |
| | TD | 3 | 3 | 3 | 2 | 2 | 2 | 1 | 6 |

TABLE 1-continued

|  | Example | | | | | Comparative Example | | |
|---|---|---|---|---|---|---|---|---|
|  | 1 | 2 | 3 | 4 | 5 | 1 | 2 | 3 |
| evenness of film thickness | ○ | ○ | ○ | ○ | ○ | ○ | x | x |
| bag formability | ○ | ○ | ○ | ○ | ○ | ○ | x | x |
| heat stickability | ○ | ○ | ○ | ○ | ○ | x | x | ○ |
| finish of heat - stuck portion | ○ | ○ | ○ | ○ | ○ | ○ | ○ | x |
| heat sealability of aluminum laminated film | ○ | ○ | ○ | ○ | ○ | ○ | ○ | ○ |
| finish of aluminum laminated film | ○ | ○ | ○ | ○ | ○ | ○ | ○ | x |
| Total evaluation | ○ | ○ | ○ | ○ | ○ | x | x | x |

※MD: Machine direction
※TD: Transverse direction

What is claim is:

1. A biodegradable biaxially stretched single-layer film for sealable packaging, comprising a polylactic acid-family polymer as the major component, and having a storage elastic modulus E' at 120° C. of 100–230 MPa as measured using test method concerning temperature dependency of the dynamic viscous elasticity under JIS K7198.

2. The biodegradable biaxially stretched single-layer film for sealable packaging, as claimed in claim 1 wherein it is biaxially stretched at an area stretching ratio of 6.8 times or over and at a longitudinal stretching temperature of 70–90° C. and a lateral stretching temperature of 70–80° C., and after biaxial stretching, subjected to heat setting in a gripped state at a temperature in the range of 100° C. to its melting point (Tm).

3. The biodegradable biaxially stretched single-layer film for sealable packaging, as claimed in claim 2 wherein it has a tensile strength of 1000–2000 kgf/cm$^2$ and a tensile elongation of 50–150% as measured at a tensile speed of 200 mm/min using No.2 test specimens under JIS K 7127.

4. The biodegradable biaxially stretched single-layer film for sealable packaging as claimed in claim 2 wherein the weight-average molecular weight of said polylactic acid-family polymer is 60000 to 700000.

5. A bag made from the biodegradable biaxially stretched single-layer film for sealable packaging as claimed in claim 2.

6. The biodegradable biaxially stretched single-layer film for sealable packaging, as claimed in claim 1 wherein it is simultaneously biaxially stretched at an area stretching ratio of 6.8 times or over and at the stretching temperature of 70–80° C., and after biaxial stretching, subjected to heat setting in a gripped state at a temperature in the range of 100° C. to its melting point (Tm).

7. The biodegradable biaxially stretched single-layer film for sealable packaging, as claimed in claim 6 wherein it has a tensile strength of 1000–2000 kgf/cm$^2$ and a tensile elongation of 50–150% as measured at a tensile speed of 200 mm/min using No. 2 test specimens under JIS K 7127.

8. The biodegradable biaxially stretched single-layer film for sealable packaging as claimed in claim 6 wherein the weight-average molecular weight of said polylactic acid-family polymer is 60000 to 700000.

9. A bag made from the biodegradable biaxially stretched single-layer film for sealable packaging as claimed in claim 6.

10. The biodegradable biaxially stretched single-layer film for sealable packaging, as claimed in claim 1 wherein it has a tensile strength of 1000–2000 kgf/cm$^2$ and a tensile elongation of 50–150% as measured at a tensile speed of 200 mm/min using No. 2 test specimens under JIS K 7127.

11. The biodegradable biaxially stretched single-layer film for sealable packaging as claimed in claim 10 wherein the weight-average molecular weight of said polylactic acid-family polymer is 60000 to 700000.

12. A bag made from the biodegradable biaxially stretched single-layer film for sealable packaging as claimed in claim 10.

13. The biodegradable biaxially stretched single-layer film for sealable packaging, as claimed in claim 1 wherein the weight-average molecular weight of said polylactic acid-family polymer is 60000 to 700000.

14. A bag made from the biodegradable biaxially stretched single-layer film for sealable packaging as claimed in claim 13.

15. A bag made from the biodegradable biaxially stretched single-layer film for sealable packaging as claimed in claim 1.

* * * * *